US012572936B2

(12) United States Patent
Tero et al.

(10) Patent No.: US 12,572,936 B2
(45) Date of Patent: Mar. 10, 2026

(54) QR CODE PAYOR TRACKING AND REPEAT PAYMENT PREVENTION

(71) Applicant: Capital One Services, LLC, McLean, VA (US)

(72) Inventors: Jacqueline Nicole Tero, Brooklyn, NY (US); Keegan Franklin, Tucson, AZ (US); Patrick Babcock, Boston, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/644,939

(22) Filed: Apr. 24, 2024

(65) Prior Publication Data

US 2025/0335911 A1 Oct. 30, 2025

(51) Int. Cl.
| | |
|---|---|
| *G06Q 20/40* | (2012.01) |
| *G06Q 20/22* | (2012.01) |
| *G06Q 20/32* | (2012.01) |
| *G06Q 20/38* | (2012.01) |

(52) U.S. Cl.
CPC ......... *G06Q 20/401* (2013.01); *G06Q 20/227* (2013.01); *G06Q 20/3223* (2013.01); *G06Q 20/3276* (2013.01); *G06Q 20/389* (2013.01)

(58) Field of Classification Search
CPC .............. G06Q 20/401; G06Q 20/227; G06Q 20/3223; G06Q 20/3276; G06Q 20/389
USPC .......................................................... 705/75
See application file for complete search history.

(56) References Cited

U.S. PATENT DOCUMENTS

| | | | |
|---|---|---|---|
| 5,515,451 | A | 5/1996 | Tsuji et al. |
| 7,391,934 | B2 | 6/2008 | Goodall et al. |
| 7,421,107 | B2 | 9/2008 | Lugg |
| 7,526,117 | B2 | 4/2009 | Foth et al. |
| 7,587,066 | B2 | 9/2009 | Cordery et al. |
| 7,698,222 | B1 | 4/2010 | Bueche |
| 7,702,588 | B2 | 4/2010 | Gilder et al. |
| 7,734,545 | B1 | 6/2010 | Fogliano et al. |
| 7,818,307 | B1 | 10/2010 | Young et al. |

(Continued)

FOREIGN PATENT DOCUMENTS

| | | |
|---|---|---|
| JP | 2020021419 A | 2/2020 |
| KR | 2570769 B1 | 8/2023 |
| WO | 2023091068 A1 | 5/2023 |

OTHER PUBLICATIONS

Rose, Lydia M. "Modernizing check fraud detection with machine learning." PhD dissertation. Utica College. 2018.

(Continued)

*Primary Examiner* — Courtney P Jones
(74) *Attorney, Agent, or Firm* — Sterne, Kessler, Goldstein & Fox P.L.L.C.

(57) ABSTRACT
A computer implemented method, system, and non-transitory computer-readable device usable in a mobile transaction environment. A customer scans a purchasing code (e.g., a quick-response (QR) code) using, for example, a mobile device. The QR code is encoded with a payment configuration ID and a merchant account token associated with bank account information for the merchant. Historical purchases for the customer, are analyzed in real time to alert a customer of potential duplicate purchases through a UI on the mobile device. The user may complete or cancel the current transaction by interacting with the UI.

20 Claims, 8 Drawing Sheets

500

(56)                References Cited

U.S. PATENT DOCUMENTS

| | | | |
|---|---|---|---|
| 7,856,402 | B1 | 12/2010 | Kay |
| 7,905,396 | B2 | 3/2011 | Tidwell et al. |
| 7,949,587 | B1 | 5/2011 | Morris et al. |
| 8,027,928 | B1 | 9/2011 | Hecht, Jr. et al. |
| 8,050,997 | B1 | 11/2011 | Nosek et al. |
| 8,060,442 | B1 | 11/2011 | Hecht et al. |
| 8,104,676 | B2 | 1/2012 | Ramachandran |
| 8,213,782 | B2 | 7/2012 | Jelinek |
| 8,271,381 | B2 | 9/2012 | O'Brien et al. |
| 8,290,876 | B1 | 10/2012 | Powell |
| 8,296,230 | B2 | 10/2012 | Davis et al. |
| 8,300,917 | B2 | 10/2012 | Borgia et al. |
| 8,332,329 | B1 | 12/2012 | Thiele |
| 8,381,969 | B1* | 2/2013 | Miller .................. G06Q 20/382 |
| | | | 235/375 |
| 8,406,500 | B2 | 3/2013 | Najari et al. |
| 8,464,933 | B1 | 6/2013 | Prasad et al. |
| 8,582,862 | B2 | 11/2013 | Nepomniachtchi et al. |
| 8,605,982 | B2 | 12/2013 | Jackson et al. |
| 8,626,661 | B2 | 1/2014 | Gilder |
| 8,632,001 | B1 | 1/2014 | Ramachandran et al. |
| 8,638,363 | B2 | 1/2014 | King et al. |
| 8,639,105 | B2 | 1/2014 | Ogino |
| 8,708,227 | B1 | 4/2014 | Oakes, III et al. |
| 8,745,073 | B2 | 6/2014 | Mulligan et al. |
| 8,811,711 | B2 | 8/2014 | Calman et al. |
| 8,885,963 | B2 | 11/2014 | Coleman |
| 8,958,605 | B2 | 2/2015 | Amtrup et al. |
| 8,959,033 | B1 | 2/2015 | Oakes, III et al. |
| 8,983,170 | B2 | 3/2015 | Nepomniachtchi et al. |
| 8,995,012 | B2 | 3/2015 | Heit et al. |
| 9,064,248 | B2 | 6/2015 | Huff et al. |
| 9,092,447 | B1* | 7/2015 | Anderson .......... G06Q 30/0185 |
| 9,324,073 | B2 | 4/2016 | Nepomniachtchi et al. |
| 9,384,392 | B2 | 7/2016 | Weber et al. |
| 9,483,761 | B2 | 11/2016 | Brendell et al. |
| 9,558,493 | B2 | 1/2017 | Carrott |
| 9,569,756 | B1 | 2/2017 | Bueche, Jr. et al. |
| 9,640,041 | B2 | 5/2017 | Block et al. |
| 9,652,690 | B2 | 5/2017 | Eid et al. |
| 9,672,510 | B2 | 6/2017 | Roach et al. |
| 9,679,281 | B2 | 6/2017 | Moshal |
| 9,684,920 | B2 | 6/2017 | Kalgi et al. |
| 9,721,177 | B2 | 8/2017 | Lee et al. |
| 9,747,509 | B2 | 8/2017 | Eid et al. |
| 9,779,392 | B1 | 10/2017 | Prasad et al. |
| 9,807,263 | B2 | 10/2017 | Bala et al. |
| 9,852,406 | B2 | 12/2017 | Doyle et al. |
| 9,852,409 | B2 | 12/2017 | Artman et al. |
| 10,026,119 | B2 | 7/2018 | Green et al. |
| 10,192,108 | B2 | 1/2019 | Nepomniachtchi et al. |
| 10,210,522 | B1 | 2/2019 | Medina, III et al. |
| 10,217,375 | B2 | 2/2019 | Waldron et al. |
| 10,402,790 | B1 | 9/2019 | Clark et al. |
| 10,460,381 | B1 | 10/2019 | Pollack et al. |
| 10,504,185 | B1 | 12/2019 | Buentello |
| 10,552,810 | B1 | 2/2020 | Ethington et al. |
| 10,635,898 | B1 | 4/2020 | Pribble et al. |
| 10,692,230 | B2 | 6/2020 | Anderson et al. |
| 10,699,146 | B2 | 6/2020 | Shustorovich et al. |
| 10,706,466 | B1 | 7/2020 | Ethington et al. |
| 10,762,502 | B1* | 9/2020 | Yoshida ............... G06Q 20/389 |
| 10,762,579 | B2 | 9/2020 | Riechers et al. |
| 10,769,598 | B1 | 9/2020 | Oakes, III et al. |
| 10,789,496 | B2 | 9/2020 | Kotovich et al. |
| 10,853,771 | B2 | 12/2020 | Enobakhare |
| 10,855,914 | B1 | 12/2020 | Prasad et al. |
| 10,909,362 | B2 | 2/2021 | Nepomniachtchi et al. |
| 11,064,111 | B1 | 7/2021 | Prasad et al. |
| 11,068,867 | B1 | 7/2021 | Tucker |
| 11,126,975 | B2 | 9/2021 | Haldenby et al. |
| 11,127,008 | B1 | 9/2021 | Buentello et al. |
| 11,145,169 | B2 | 10/2021 | Pratten et al. |
| 11,157,731 | B2 | 10/2021 | Nepomniachtchi et al. |
| 11,159,733 | B2 | 10/2021 | Mukul |
| 11,200,550 | B1 | 12/2021 | Singfield |
| 11,210,379 | B1 | 12/2021 | Lindley et al. |
| 11,216,884 | B1 | 1/2022 | Buentello |
| 11,222,313 | B2 | 1/2022 | Doyle et al. |
| 11,244,302 | B2 | 2/2022 | Ekpenyong et al. |
| 11,244,319 | B2 | 2/2022 | Navarro et al. |
| 11,282,086 | B1 | 3/2022 | Medina, III et al. |
| 11,288,661 | B2 | 3/2022 | Hammad et al. |
| 11,295,377 | B1 | 4/2022 | Ethington et al. |
| 11,295,378 | B1 | 4/2022 | Voutour et al. |
| 11,315,217 | B2 | 4/2022 | Ilic et al. |
| 11,321,709 | B1 | 5/2022 | Kolchin |
| 11,373,150 | B1 | 6/2022 | Bueche, Jr. et al. |
| 11,449,841 | B1 | 9/2022 | Srinivasarangan et al. |
| 11,516,383 | B2 | 11/2022 | Ilic et al. |
| 11,531,973 | B1 | 12/2022 | Prasad et al. |
| 11,539,848 | B2 | 12/2022 | Roach et al. |
| 11,562,332 | B1 | 1/2023 | Oakes, III et al. |
| 11,610,294 | B2 | 3/2023 | Dewitt et al. |
| 11,640,627 | B2 | 5/2023 | Fotso et al. |
| 11,676,285 | B1 | 6/2023 | Backlund et al. |
| 11,682,222 | B1 | 6/2023 | Oakes, III et al. |
| 11,694,268 | B1 | 7/2023 | Buentello |
| 11,704,627 | B2 | 7/2023 | Gordon et al. |
| 11,710,210 | B1 | 7/2023 | Medina, III |
| 11,798,253 | B2 | 10/2023 | Pribble et al. |
| 11,810,382 | B2 | 11/2023 | Laza et al. |
| 11,829,962 | B2 | 11/2023 | Burnam et al. |
| 11,900,755 | B1 | 2/2024 | Bueche, Jr. |
| 2005/0283444 | A1 | 12/2005 | Ekberg |
| 2006/0036537 | A1 | 2/2006 | Lawrence et al. |
| 2008/0140579 | A1 | 6/2008 | Agarwal |
| 2009/0171839 | A1 | 7/2009 | Rosano et al. |
| 2012/0040717 | A1 | 2/2012 | Levy et al. |
| 2013/0013491 | A1 | 1/2013 | Selway et al. |
| 2013/0054461 | A1 | 2/2013 | Gupta et al. |
| 2013/0176473 | A1 | 7/2013 | Ogino |
| 2013/0198069 | A1 | 8/2013 | Latimer |
| 2013/0204783 | A1 | 8/2013 | Klose et al. |
| 2014/0006224 | A1 | 1/2014 | Grigg et al. |
| 2014/0074697 | A1 | 3/2014 | Foster |
| 2014/0114852 | A1 | 4/2014 | Rajagopal et al. |
| 2014/0122332 | A1 | 5/2014 | Viera et al. |
| 2014/0236767 | A1 | 8/2014 | Duggal et al. |
| 2015/0032626 | A1 | 1/2015 | Dill et al. |
| 2015/0120564 | A1 | 4/2015 | Smith et al. |
| 2017/0270508 | A1 | 9/2017 | Roach et al. |
| 2017/0309108 | A1 | 10/2017 | Sadovsky et al. |
| 2017/0336511 | A1 | 11/2017 | Nerurkar |
| 2018/0103112 | A1* | 4/2018 | Jones-McFadden ... G06Q 20/00 |
| 2018/0260806 | A1* | 9/2018 | Bhuma .............. G06Q 20/3226 |
| 2019/0066089 | A1* | 2/2019 | Miryala .............. G06Q 20/367 |
| 2020/0042915 | A1 | 2/2020 | Widdows |
| 2020/0334647 | A1 | 10/2020 | Malhotra et al. |
| 2020/0389600 | A1 | 12/2020 | Capurso et al. |
| 2021/0035086 | A1 | 2/2021 | Khan et al. |
| 2021/0174361 | A1 | 6/2021 | Potireddy et al. |
| 2021/0360149 | A1 | 11/2021 | Mukul |
| 2022/0245985 | A1 | 8/2022 | Bhutani et al. |
| 2022/0277291 | A1 | 9/2022 | Roongta et al. |
| 2022/0335393 | A1 | 10/2022 | Gupta et al. |
| 2022/0343301 | A1 | 10/2022 | Edwards et al. |
| 2022/0343398 | A1 | 10/2022 | Han |
| 2022/0358575 | A1 | 11/2022 | Smith |
| 2023/0060395 | A1 | 3/2023 | Roach et al. |
| 2023/0060464 | A1 | 3/2023 | Ceesay |
| 2023/0084370 | A1 | 3/2023 | Bradford |
| 2023/0113752 | A1* | 4/2023 | Jorlett ...................... G06N 5/04 |
| | | | 705/44 |
| 2023/0120865 | A1 | 4/2023 | Nascimento et al. |
| 2023/0133158 | A1 | 5/2023 | Kolchin |
| 2023/0196319 | A1 | 6/2023 | Ng et al. |
| 2023/0196706 | A1 | 6/2023 | Scott |
| 2023/0209116 | A1 | 6/2023 | Leung et al. |
| 2023/0281629 | A1 | 9/2023 | Shevyrev et al. |
| 2023/0289808 | A1 | 9/2023 | Kolchin |
| 2023/0351782 | A1 | 11/2023 | Fitzgerald |
| 2024/0193612 | A1* | 6/2024 | Roberts .................... G06N 3/08 |
| 2025/0045767 | A1* | 2/2025 | Ammatanda ........ G06Q 20/202 |

(56) References Cited

U.S. PATENT DOCUMENTS

OTHER PUBLICATIONS remotedepositcapture.com, "Ensenta Business Mobile with Multi-Check", Available from the Internet at https://www.remotedepositcapture.com/RDC/media/RDC-Forum/Submitted-Sponsor-Brochures/EnsentaBusinessMobileMultiCheck-e-_2018_2_14_12_52_3.pdf, [site visited on May 19, 2023], pp. 1-2.

Bills, Steve, "Automated Amount Scanning Is Trend in Remote-Deposit," American Banker, New York, NY, Aug. 30, 2005, (4 pgs).

Dunga et al. "Electronic Booking and Payment Platforms for Inter-Campus E-Bikes". Engineering Proceedings. Jul. 14, 2023. pp. 1-14. vol. 41, Issue 12.

Aletihadpayments. "Aani | Split the bill with your friends". Oct. 16, 2023. Located via YouTube, free copy available at https://www.youtube.com/watch?v=_ wys 12-0KmE.

Katariya. "Mastering QR Code Payments: A Guide to Seamless and Effortless Transactions". Jun. 12, 2023. Located via Google Web, free copy available at https://www.mooninvoice.com/blog/qr-code-payments/.

PayBy. "PayBy: Easily Split Bills of Group Expenses". Retrieved from the Internet on Dec. 21, 2023. Located via Google Web, free copy available at https://www.payby.com/split-bills.

Natwest. "Request money from someone or split a bill". Retrieved from the Internet on Dec. 21, 2023. Located via Google Web, free copy available at https://www.natwest.com/waystopay/payme.html.

Spoton. "QR Scan & Pay / Order & Pay | SpotOn Order". Jul. 19, 2023. Located via Google Web, free copy available at https://help.spoton.com/space/SK/2457829381/QR+Scan+%26+Pay+%2F+Order+%26+Pay+%7C+SpotOn+Order.

Spoton. "QR Split Payment | SpotOn Order". Jul. 19, 2023. Located via Google Web, free copy available at https://help.spoton.com/space/SK/2262565040/QR+Split+Payment+%7C+SpotOn+Order.

photo.stackexchange.com, "What of those EXIF values tell me more about my image's quality?" Jul. 8, 2017, Photography Stack Exchange, Located via Google Web, available at https://photo.stackexchange.com/questions/90730/what-of-those-exif-values-tell-me-more-about-my-images-quality.

Abraham, "MoiréPattern Detection using Wavelet Decomposition and Convolutional Neural Network," Amadeus Software Labs Pvt. Ltd, IEEE (2018).

Yang, et al., "Doing More with Moire Pattern Detection in Digital Photos," Journal of Latex Class Files, vol. 14, No. 8 (Aug. 2021).

Digital Check, "Money Orders Giving You Trouble? We've Got The Solution!" Oct. 1, 2008. Located via Google Web, available at https://www.digitalcheck.com/moneyorders-dcom/.

International Search Report and Written Opinion for International Application No. PCT/US2025/025611, mailed on Jul. 24, 2025, 13 pages.

* cited by examiner

400
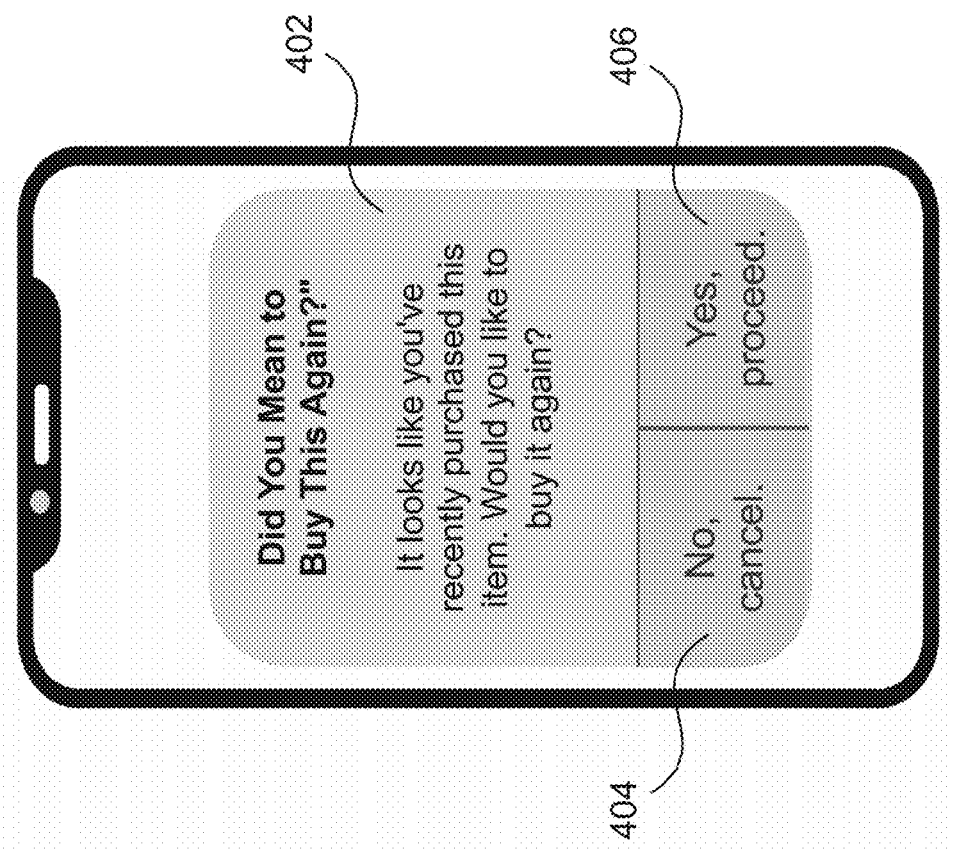
402
**Did You Mean to
Buy This Again?"**
It looks like you've
recently purchased this
item. Would you like to
buy it again?
No,
cancel.
404
Yes,
proceed.
406
FIG. 4

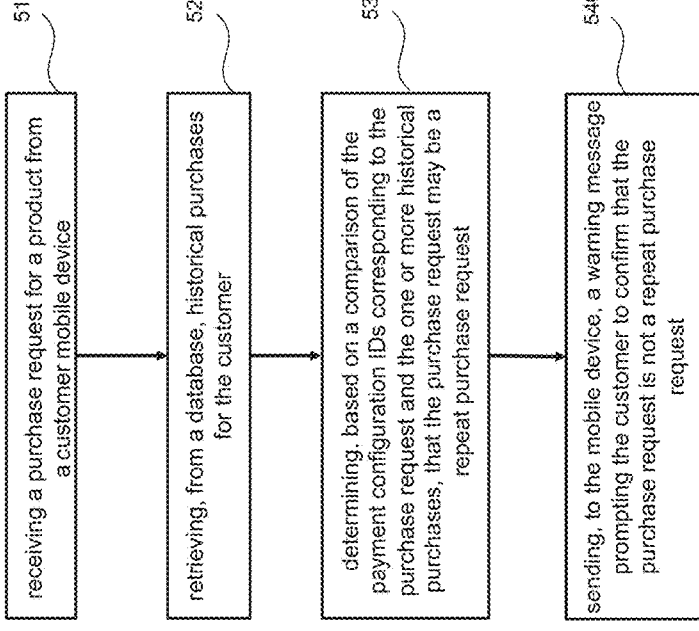

500

510 receiving a purchase request for a product from a customer mobile device

520 retrieving, from a database, historical purchases for the customer

530 determining, based on a comparison of the payment configuration iDs corresponding to the purchase request and the one or more historical purchases, that the purchase request may be a repeat purchase request

540 sending, to the mobile device, a warning message prompting the customer to confirm that the purchase request is not a repeat purchase request

FIG. 5

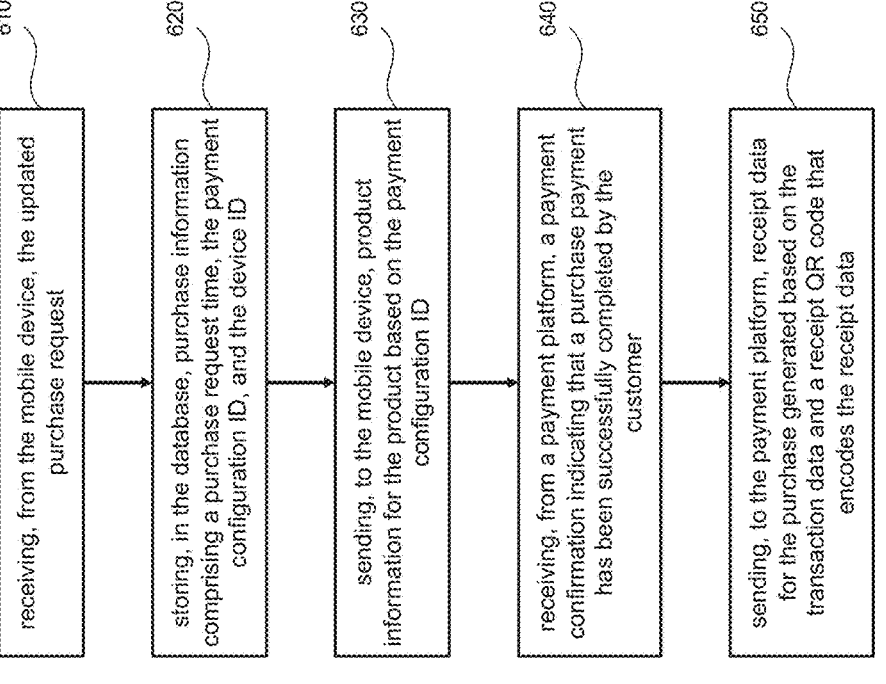

600

610 receiving, from the mobile device, the updated purchase request 620 storing, in the database, purchase information comprising a purchase request time, the payment configuration ID, and the device ID 630 sending, to the mobile device, product information for the product based on the payment configuration ID 640 receiving, from a payment platform, a payment confirmation indicating that a purchase payment has been successfully completed by the customer 650 sending, to the payment platform, receipt data for the purchase generated based on the transaction data and a receipt QR code that encodes the receipt data

710 retrieving purchase data from the database

720 analyzing the retrieved purchase data to identify unique customers, based on device IDs and customer tokens associated with the purchase data

730 aggregating purchase history for identified customers to generate customer behavior profiles

QR CODE PAYOR TRACKING AND REPEAT PAYMENT PREVENTION

BACKGROUND

In the current digital transaction environment, there's a critical need for a system that not only facilitates seamless payment processes but also integrates customer purchase data for analytics. Traditional methods lack the capability to link transactions with customer behavior insights directly. Merchants face challenges in unifying disparate payment platforms without cluttering the payment interface. A technical solution is required that can track transactions for QR code purchased products.

BRIEF DESCRIPTION OF THE DRAWINGS

The accompanying drawings are incorporated herein and form a part of the specification.

FIG. 4 illustrates a repeat purchase verification confirmation popup, according to some embodiments.

FIG. 5 illustrates a flowchart for an example method for handling repeat purchase verification, according to some embodiments.

FIG. 6 illustrates a flowchart for an example method for completing a purchase transaction after a repeat purchase verification warning, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
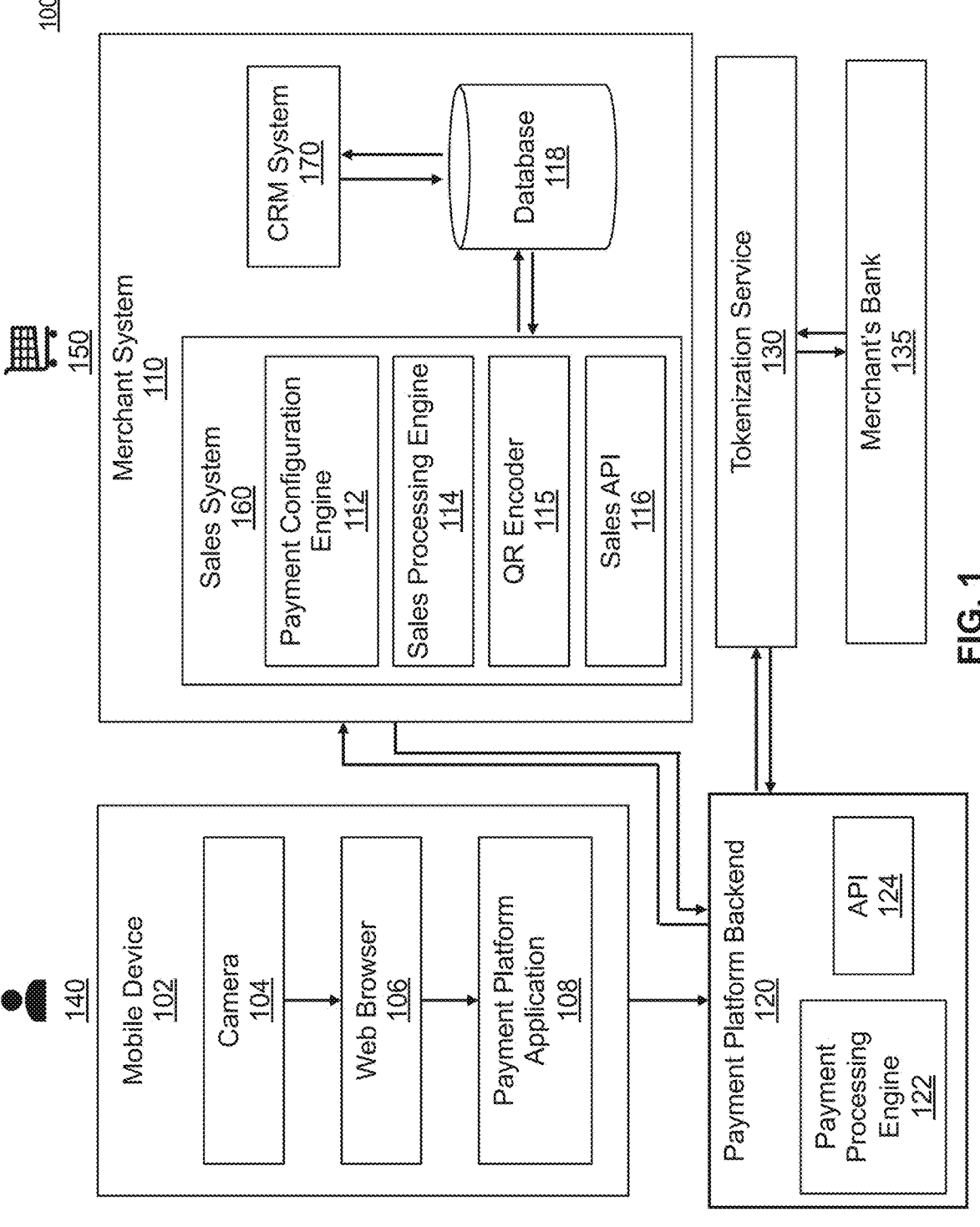
FIG. 1 illustrates a block diagram of a system for processing purchase payment transactions for purchases made using a payment configuration Quick-Response (QR) code, according to some embodiments.

Provided herein are system, apparatus, device, method, and/or computer program product embodiments, and/or combinations and sub-combinations thereof, for a QR code-based purchase and customer transaction identification system. In various aspects, this system facilitates the generation and processing of customer "self-purchase" transactions via a unique QR code. For example, a customer scans a QR code associated with a product and completes the transaction with a banking app operative with their smartphone. In this scenario, the technology disclosed herein tracks data generated as a result of the self-purchase transaction.

In various aspects, when a customer scans the QR code to make a purchase, the system may employ a device ID or a customer token, to identify the customer uniquely and generate metadata to uniquely identify the transaction and further define the customer. An analysis of this metadata assists in prevent duplicate transactions in real-time, as well as generating merchant insights of customer and product purchase profiles In a first non-limiting example, a customer scans a QR code for product A and completes the purchase. The intent is to use a payment system such as PayPal®, Venmo®, Zelle®, etc. However, sometimes the customer may accidentally scan the QR code again, initiating an unintended second purchase cycle of the same product in a time frame (e.g., within 60 seconds), which may suggest a duplicate purchase. In one aspect, because this is a transaction-based review (e.g., review of metadata associated with the transaction), the purchaser may use any payment solution. The technology described herein provides a technical solution to prevent duplicate purchases of the same product due to multiple QR scans, even across multiple payment systems.

In a second non-limiting example, a first purchaser scans a QR code for product A and completes the purchase, a second purchaser scans the same QR code for product A and completes the purchase and a third purchaser scans a QR code for product A at a different merchant location and different day, and completes the purchase. In one aspect, because this is a transaction-based review, the technology as described herein allows the merchant to aggregate and analyze the customer purchases regardless of payment solution.

In some aspects, as the payment processing may not run through the merchant's on-premises financial processing and inventory management systems, the transaction tracking technology disclosed herein may be implemented by a merchant to better understand customer profiles associated with a specific product over a selectable timeline. For example, product A was purchased by self-purchase QR codes in large quantities (2,000 single unit purchases, 1350 multiple unit purchases, etc.) in pre-holiday sales over a four week period. The technology described herein provides a technical solution to allow a merchant to understand consumer and product profiles for self-purchase products across multiple payment systems.

The technology described herein improves the functioning of the computer system itself. For example, as described above, the merchant's internal merchandise payment and tracking computer system(s) are prevented from tracking a purchase implemented by a customer's payment app that does not originate within their system. In this scenario, the merchant's and customer's purchase processing systems may lack communication and data sharing. As such, the merchant's problem of tracking product purchases and purchasers exists in the realm of computers. As the problem exists is the realm of computers, it follows that the solution must be a computer-based solution. Therefore, the computer is not merely a tool for processing, but rather provides a computer-based solution that improves the performance of the computer systems themselves.

FIG. 1 illustrates a block diagram of a system for processing payment transactions for purchases made using a payment configuration QR code, according to some embodiments. As shown in FIG. 1, system 100 includes mobile device 102, merchant system 110, payment platform back-end 120, tokenization service 130, and merchant's banking institution 135. Merchant system 110 may comprise one or more computing devices connected by a network with wired or wireless communications paths or a combination thereof and may include any combination of LANs, WANs, the Internet, etc. Merchant system 110 may include sales system 160, customer relations management system 170, and database 118. Sales system 160 may additionally comprise Payment Configuration Engine 112, Sales Processing Engine 114, QR Encoder 115, and Sales Application Programming Interface (API) 116. In some embodiments, merchant system 110 may be accessed by merchant 150 using a client device. Some example client systems include desktop computers, portable electronic devices, wearable computers, or any device running a desktop or mobile device operating system the Apple iOS™, Android™ OS, Google Chrome OS, Symbian OS®, Windows Mobile® OS, Windows Phone, etc.

While described throughout the description for QR code applications, in some aspects, QR encoder 115 may be any encoder that can encode transactional information, such as, but not limited to, the merchant's token, purchase data, product data, or payment data. Once encoded, the user may activate the data in the code (e.g., purchasing code) to complete the purchase.

In the various embodiments described herein, a QR code purchase may be a customer initiated transaction. For example, the customer selects a product with a QR code associated with the product (e.g., printed or electronically displayed), selects their payment method and completes the purchase on, for example, their payment app. This self-purchase scenario may present many problems to the merchant as they may not be able to track multiple transactions across customers, products, locations or time. As will be described in greater detail hereafter, the technology as described herein implements transaction based tracking of QR code purchases within the merchant's CRM system 170, the customer's payment platform, the customer's banking institution or any or all of these systems.

In some embodiments, merchant 150 may access merchant system 110 in order to generate a payment QR code for a product. Merchant system 110 may include a client-side application that includes a user interface through which Merchant 150 may interact with Payment Configuration Engine 112 in order to generate a payment QR code for a product. In some embodiments, this client-side application may be a web application configured to run in a web browser. Alternatively, the client-side application may be a desktop or mobile application that can be downloaded on a client device. In some embodiments, the client-side application may require merchant 150 to provide authentication credentials in order to access merchant system 110. Authentication may include, but is not limited to, requiring user credentials, such as, a username and password, biometric information, and/or include two-factor authorization.

Merchant 150 may generate a payment QR code for a product by providing a unique product identification to the client-side application. In some embodiments, Payment Configuration Engine 112 may retrieve a token corresponding to bank account information for merchant 150 from database 118 or from merchant banking institution 135. Payment Configuration Engine 112 may retrieve a merchant ID for the merchant and a base URL for a landing page. Payment configuration engine 112 may then generate a landing page for the product using the base URL and the unique product ID provided by merchant 150. The Payment Configuration Engine 112 may then generate a payment QR code for the product. QR encoder 115 may then encode the payment QR code with one or more of the merchant account tokens, merchant ID, merchant location, product landing page URL, and a unique payment configuration ID. In some embodiments, Payment Configuration Engine may send the payment QR code to the client application for merchant 150 to view and print. Payment Configuration Engine 112 may additionally store the information encoded in the payment QR code, along with the unique product ID for the corresponding product, in database 118.

In some embodiments, database 118 may include one or more inventory tracking tables. The inventory tables may keep track of the number of units of each product merchant 150 has in inventory. Database 118 may also include customer profile tables. The customer profile table may store customer profiles for unique customers who have made purchases at one or more of the merchant's 150 stores. Customer profiles may be generated by a customer relation system (CRM) system 170 based on data gathered from purchase transactions made using payment configuration QR codes. Each customer profile may include one or more of a customer token, device ID, contact information, and a purchase history.

Figure 2:
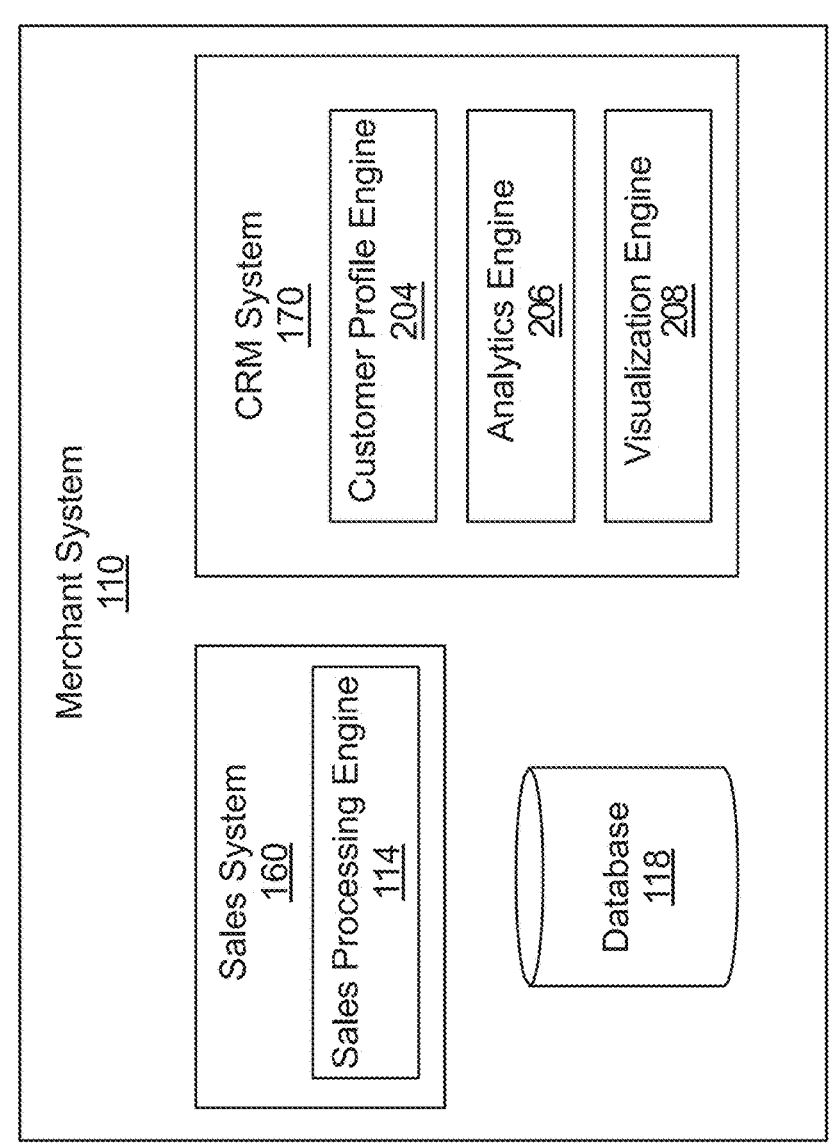
FIG. 2 illustrates a block diagram of a system for analyzing customer purchase data for purchases made using a payment configuration QR code, according to some embodiments.

Mobile device 102 may be a smartphone, tablet, wearable, or a similar device belonging to customer 140. Mobile device 102 may have an integrated camera 104, web browser 106, and payment platform application 108. Camera 104 may be capable of scanning a QR code, as shown in FIG. 2, and opening any URL encoded in the QR code in web browser 106. A web browser application may implement web browser 106.

In some embodiments, web browser 106 may send a request to merchant system 110 for information about the product corresponding to the scanned QR code in order to load a landing page for the product. The request may include the payment configuration ID and merchant ID encoded in the payment QR code. In some embodiments, the request may be received by sales API 116. Sales API 116 may then communicate with Sales Processing Engine 114. Sales processing engine 114 may be responsible for retrieving product information from database 118 based on the payment configuration ID.

In some embodiments, the product landing page may include an image of the product, a brief product description, a price for the product, and a selection of payment platforms from which customer 140 may select to complete the transaction. Alternatively, if the payment QR code corresponds to a product line, customer 140 may be directed to an attribute selection page. The attribute selection page may include at least one attribute and two or more attribute options from which to select. Attributes may be, but are not limited to, size, color, product count (e.g., 5 pack), etc. Once customer 140 has made a selection, they may be directed to the product-specific landing page to complete the purchase.

Payment platform application 108 may be a mobile application for processing payments to individuals or businesses. In some embodiments, payment platform application 108 may be a mobile banking app that offers payment platform integration with a payment platform.

Payment platform application 108 may be a client-side application for payment platform backend 120. Payment platform backend 120 may comprise one or more computing devices connected by a network with wired or wireless communications paths or a combination thereof and may include any combination of LANs, WANs, the Internet, etc. Payment platform backend 120 may comprise payment processing engine 122 and API 124. In some embodiments, payment platform backend 120 may be responsible for communicating with tokenization service 130 and merchant banking institution 135 to facilitate payment transactions from customer 140 to merchant 150. Alternatively, payment processing backend 120 may be responsible for communicating with tokenization service 130, which may, in turn, communicate with merchant banking institution 135 to complete the payment transaction.

FIG. 2 illustrates a block diagram of a system for analyzing customer purchase data for purchases made using a payment configuration QR code, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 2, as will be understood by a person of ordinary skill in the art.

Merchant 150 may access merchant system 110 using client device 202 via a client-side application that may include features such as inventory management, customer data management, and the like. The client-side application may additionally include CRM functionalities. CRM system 170 may comprise Customer Profile Engine 204, Analytics Engine 206, and Visualization Engine 208. CRM system 170 may receive purchase data from database 118 and use Analytics Engine 206 to analyze the purchase data. Customer Profile Engine 204 may generate unique customer profiles for each identified customer by assimilating various data points from purchase transactions and customer interactions. Customer profile engine 204 may identify unique customers, leveraging identifiers such as device IDs and customer tokens to ensure each profile is distinct.

In one non-limiting example, merchant 150 may use the client-side merchant system application to view insights generated by Analytics Engine 206. The application may also allow Merchant 150 to access visual representations of purchase and customer data. These visual representations may be generated by Visualization Engine 208.

Analytics Engine 206 may receive customer profile data from Customer Profile Engine 204 and perform a wide range of data analysis to identify purchase patterns and customer behavior. For example, Analytics Engine 206 may perform this analysis by applying machine learning algorithms, such as clustering algorithms for segmentation classification and for predicting customer actions and association algorithms for marketing basket analysis. For example, a specific QR code used in a series of purchases, by different customers, at different locations, may be aggregated and analyzed to uncover trends and assist the merchant in developing a better understanding of the group of customers that made these self-purchases and/or the timing for stocking products in the future.

Visualization Engine 208 may take analyzed data from Analytics Engine 206 and generate visual representations of this data. For instance, Visualization Engine 208 may transform complex customer behavior patterns and purchase trends into intuitive charts and graphs. Visualization Engine 208 may employ various data visualization techniques to accomplish this task, such as creating heat maps to represent high-density purchasing zones or line graphs to depict sales trends over time. These visual tools are invaluable to a merchant because they provide a quick, digestible way to comprehend complex data sets, revealing actionable insights that can drive marketing strategies, optimize inventory management, and ultimately enhance customer satisfaction and sales.

Merchant 150 may use client device 202 to access CRM system 170 to review purchase patterns, customer behaviors, and other insights that may be useful for planning, sales, marketing campaigns, or the like. CRM system 170 may allow merchant 150 to specify the types of purchase data and customer data they wish to analyze and visualize. Merchant 150 may select options, including data ranges, customer demographics, purchasing behavior, sales performance metrics, etc. Additionally, Visualization Engine 208 may provide options for data, visualization, configurations, and styles. Data visualization options may include graphs, charts, or heat maps tailored to highlight specific insights, such as peak purchase times, product infinity, customer, lifetime, value, purchase, frequency, etc. These features enable Merchant 150 to customize the analysis and visualization to their specific business needs, providing targeted and actionable insights.

Figure 3:
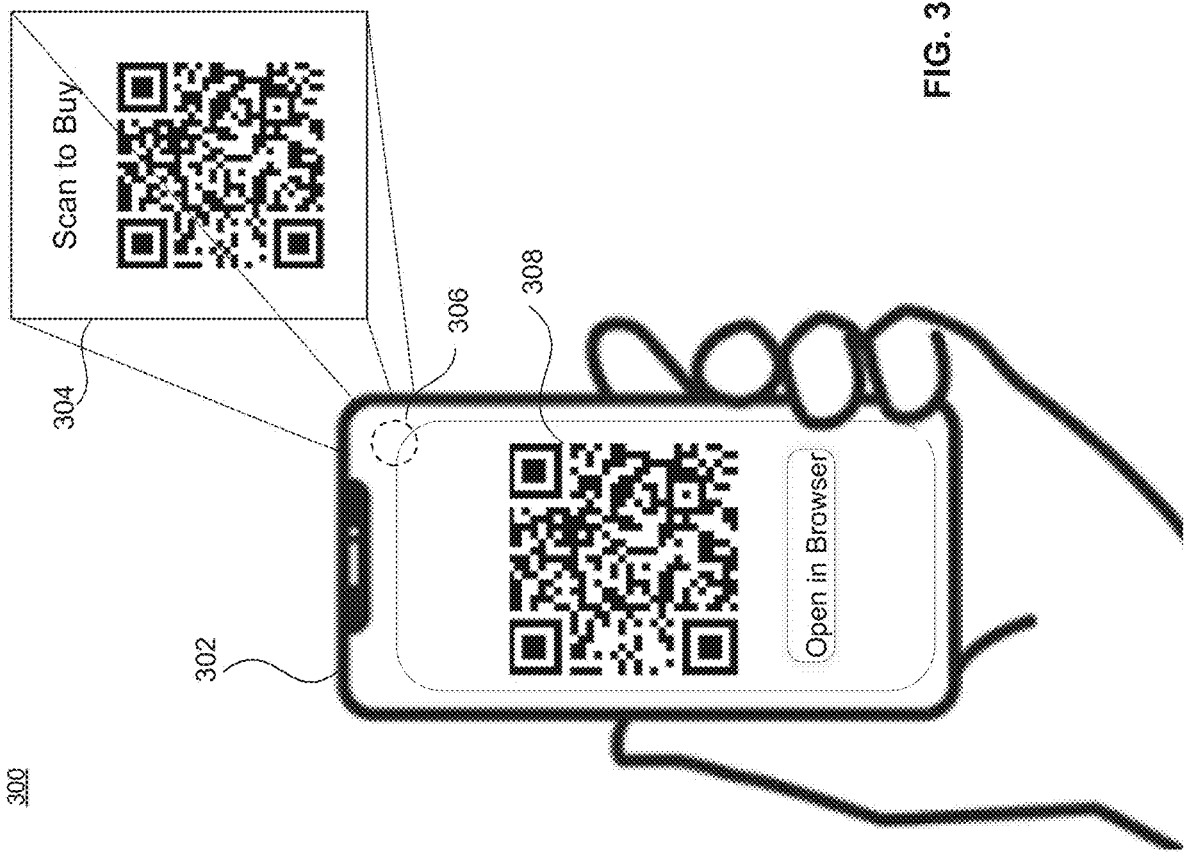
FIG. 3 illustrates a mobile device scanning a payment configuration QR code in order to make a purchase from a merchant, according to some embodiments.

FIG. 3 illustrates a mobile device 302 scanning a payment configuration QR code 304 in order to make a purchase of a product or service from a merchant, according to some embodiments. Merchant 150 may generate a payment QR code for a plurality of products or services available for purchase at a particular location. Merchant 150 may display each payment QR code next to the corresponding product at the merchant location for which the QR codes were generated. For example, payment QR code 304 may be displayed next to a corresponding product at a store location for merchant 150. Payment QR code 304 may encode a merchant ID, merchant account token, product landing page URL, product cost, and a unique payment configuration ID. The merchant ID may correspond to merchant 150. Alternatively, the merchant ID may correspond to a specific store location for merchant 150.

Customer 140 may use mobile device 102 (e.g., smartphone 302) to scan payment QR code 304. As previously described, mobile device 102 may include a built-in camera 104, display screen 306, web browser 106, and payment platform application 108. Mobile device 102 may also be configured to recognize and scan payment QR code 304 when camera 104 is focused on the QR code. For example, customer 140 may point camera 104 of mobile device 102 at payment QR code 304 and manually focus, or alternatively, allow an autofocus feature of mobile device 102 to bring the QR code into focus. In response, mobile device 102 may scan payment QR code 404 and display on display screen 306 payment QR code 304 within the view field of camera 104 and a button 308. Button 308 may be a UI element that, when selected, is configured to cause mobile device 102 to launch web browser 106 and load the product landing page URL encoded in payment QR code 304. Alternatively, or in addition to, the web browser may auto-launch as the QR code may include a command to redirect web browser 106. Customer 140 may then select a payment solution to complete a purchase transaction to purchase product 302 using payment platform application 108 (e.g., bank app).

FIG. 4 illustrates a repeat purchase verification confirmation popup, according to some embodiments. In some embodiments, merchant system 110 may be configured to verify purchase requests to prevent repeat purchase payments. For example, customer 140 may make up the purchase of a product using a payment configuration QR code but may not immediately receive a purchase receipt. This may occur for a variety of reasons, including but not limited to network latency method of contact week, batch processing, Wi-Fi signal, etc. In such a scenario, customer 140 may assume the purchase transaction was not successfully completed and proceed to scan the payment configuration QR code again to complete the purchase. In some embodiments, Sales Processing Engine 114 retrieves historical purchases for Customer 140 from the database upon receiving a purchase request from mobile device 102. Sales Processing Engine 114 may do this by searching the database for QR code transaction data with a matching QR code, device ID, token, product ID, or location ID, or combinations thereof.

In some embodiments, Sales Processing Engine 114 retrieves historical purchases for Customer 140 from the database upon receiving a purchase request from mobile device 102. Sales Processing Engine 114 may do this by searching the database for purchased data with a matching device ID to the device ID included in the purchase request. In some embodiments, Sales Processing Engine 114 may retrieve recent historical purchases for customer 140 by filtering the customer's purchase history to include only purchases made within a predetermined repeat purchase verification time threshold. Merchant 150 may set the repeat purchase verification time threshold in some embodiments. For example, merchant 150 may set the repeat purchase verification time threshold to 15 minutes. Accordingly, Sales Processing Engine 114 may retrieve purchase data for customer 140 with a purchase request or payment transaction time within the last 15 minutes.

In some embodiments, Sales Processing Engine 114 may compare the payment configuration ID of the purchase request to the payment configuration IDs of the purchases in customer 140's recent purchase history data. If a match is found, the Sales Processing Engine 114 may respond to the customer's mobile device with a repeat payment warning message. In some embodiments, the repeat payment warning message may prompt customer 142 to confirm that they wish to purchase the product corresponding to the payment configuration ID again.

In some embodiments, the repeat payment warning message may be displayed in a popup UI component, as shown in FIG. 4. The repeat payment warning message UI component may comprise a title, a message, body 402, and two selectable UI components. The first selectable you are component may be cancel button 404, which, when selected, causes the purchase request to be canceled. The second selectable UI component may be confirmation button 406, which one selected causes the mobile device to send an updated purchase request to merchant system 110. In some embodiments, the updated purchase request may include a repeat request status indicating that the updated purchase request is not a repeat request. This repeat request status indicator allows Sales Processing Engine 114 to determine that the purchase request is not a repeat request and can be processed without performing a repeat payment validation check.

While described above for implementation by the Sales Processing Engine 114, the duplicate prevention techniques may be implemented by the customer's banking application using the same or similar data or alternatively, may be implemented by the Sales Processing Engine 114 communicating with the customer's or merchant's bank. For example, using the customer token, the customer's information (e.g., name, contact information, demographic info, etc.) may be communicated from the customer's bank. In another example, using the merchant's token, the transaction information, such as purchase amount, date, time, location, etc., may be communicated from the merchant's bank.

FIG. 5 illustrates a flowchart for an example method for handling repeat purchase verification, according to some embodiments. Method 500 may be executed by one or more of the components discussed above in reference to FIGS. 1-4. In one or more embodiments, one or more of the steps shown in FIG. 5 may be omitted, repeated, and/or performed in a different order than the order shown in FIG. 5. Accordingly, the scope of the invention should not be considered limited to the specific arrangement of steps shown in FIG. 5. The steps shown in FIG. 5 may be implemented as computer-readable instructions stored on computer-readable media, where, when the instructions are executed, cause a processor to perform the process of FIG. 5. Method 500 shall be described with reference to FIGS. 1-5. However, method 500 is not limited to those example embodiments.

In 510, merchant system 110 may receive a purchase request from mobile device 102 via sales API 116. The request may be initiated by customer 140 scanning a payment QR code for a product sold by the merchant using camera 104 of mobile device 102. Once camera 104 has scanned the payment QR code for the product, the customer is prompted to open the link encoded in the QR code in web browser 106. An example of this is illustrated in FIG. 3. Customer 140 may then select the "Open in Browser" button, causing mobile device 102 to open web browser 106 and send a request to merchant system 110. The request may include the information encoded in the payment QR code as described above. Additionally, or alternatively, the scanning of the QR code may initiate an automatic purchase. In this example, the consumer could rapidly scan and purchase items and have the purchase completed by preselected forms of payment.

In 520, merchant system 110 may retrieve, from a database, historical purchases for the customer. Sales processing engine 114 may query database 118 for purchases having the same QR code, device ID, token, as the purchase request and a purchase request or purchase transaction time within a predetermined repeat purchase verification time threshold. If the query returns one or more purchases, Sales Processing Engine 114 may compare the payment configuration ID for each of the one or more purchases.

In 530, merchant system 110 may determine, based on a comparison of the payment configuration IDs corresponding to the purchase request and one or more historical purchases, that the purchase request may be a repeat purchase request. In some embodiments, Payment Processing Engine 114 may determine if a repeat payment warning message is required. Sales processing engine 114 may make this discrimination based on the comparison of payment configuration ID values performed in 520. For example, if any of the recent purchases for customer 140 have a payment configuration ID value matching the payment configuration ID in the purchase request, a repeat payment warning message is required.

In 540, merchant system 110 may send, to the mobile device, a warning message prompting the customer to confirm that the purchase request is not a repeat purchase request. The repeat payment warning message may comprise a message informing customer 140 that they recently purchased this item and prompting customer 140 to confirm if they would like to purchase the item again. Mobile device 102 may display the purchase warning message in a popup UI component. In some embodiments, the UI component may include a selectable cancellation button, indicating that the customer would like to cancel the repeat purchase request. UI component may additionally include a selectable confirmation button, indicating that the customer would like to proceed with the second purchase transaction. If customer 140 selects the confirmation button, an updated purchase request with a repeat payment status indicating that a repeat payment verification check is not required. Accordingly, merchant system 110 may process the purchase request normally without a repeat payment verification check as described in method 600.

FIG. 6 illustrates a flowchart for an example method for completing a purchase transaction after a repeat purchase verification warning, according to some embodiments. Method 600 may be executed by one or more of the components discussed above in reference to FIGS. 1-4. In one or more embodiments, one or more of the steps shown in FIG. 6 may be omitted, repeated, and/or performed in a different order than the order shown in FIG. 6. Accordingly, the scope of the invention should not be considered limited to the specific arrangement of steps shown in FIG. 6. The steps shown in FIG. 6 may be implemented as computer-readable instructions stored on computer-readable media, where, when the instructions are executed, cause a processor to perform the process of FIG. 6. Method 600 shall be described with reference to FIGS. 1-5. However, method 600 is not limited to those example embodiments.

In 610, merchant system 110 may receive an updated purchase request from mobile device 102.

In 620, merchant system 110 may store purchase information comprising a purchase request time, the purchase payment configuration ID, and the device ID for mobile device 102 in data database 118.

In 630, merchant system 110 may send product information for the product corresponding to the payment configuration ID to mobile device 102. Product information may include price, color options, size options, package count, etc.

In 640, merchant system 110 may receive a confirmation indicating that a purchase payment transaction has been successfully completed by customer 140 from a payment platform. In some embodiments, the payment platform is selected by customer 140 from a plurality of payment platforms from which the customer can complete a purchase payment transaction. In some embodiments, the confirmation may comprise a payment platform identifier and transaction data for the purchase, wherein the transaction data includes the payment configuration ID, the device ID, and a custom token corresponding to custom 140.

In 650, merchant system 110 may generate receipt data and a receipt QR code for the purchase based on the transaction data. In some embodiments, the receipt QR code may be generated by Payment Configuration Engine 112. Alternatively, the receipt code may be generated by Sales Processing Engine 114. In some embodiments, QR and coder 115 may encode the receipt QR code with the generated receipt. In some embodiments, Sales Processing Engine 114 may send the receipt data and receipt. QR code to the payment platform. In some embodiments, customer 140 may be presented with an option to provide contact information through which merchant 150 may contact them directly. In some embodiments, customer contact information may be obtained from the customer's bank based on the device ID, token, transaction ID, purchase metadata, or be based on a customer ID used during bank app login. In some aspects, after a first occurrence of matching a QR code transaction to a first customer, for example using the device ID, all future transactions made with the same mobile device may be attributed to the same customer using historical data stored by the merchant (e.g., in database 118) and would not require further customer identification steps.

Merchant 150 may use the customer contact information to identify the customer for future promotions, marketing campaigns, or exclusive deals. In some embodiments, Sales Processing Engine 114 may use the customer 140's contact information to send the purchase receipt and receipt QR code directly to customer 140.

Figure 7:
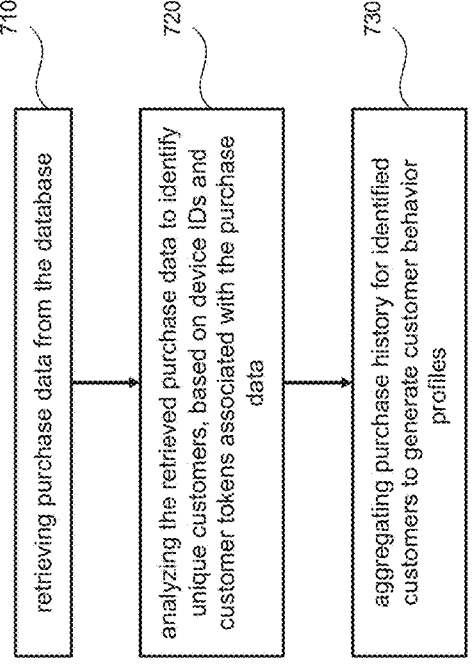
FIG. 7 illustrates a flowchart for an example method of identifying customers from purchase data generated from payment configuration QR code purchases, according to some embodiments.

FIG. 7 illustrates a flowchart for an example method of identifying customers from purchase data generated from payment configuration QR code purchases, according to some embodiments.

In 710, merchant system 110 may retrieve purchased data from database 118. In some embodiments, Customer Profile Engine 204 may retrieve purchase data from database 118 based on selections made by merchant 150. The purchase data may comprise data for a plurality of purchases wherein the data for each purchase includes one or more of purchase information, device ID, and customer token.

In 720, merchant system 110 may analyze the retrieved purchase data to identify unique customers based on any of the previously described methods, such as at least one of device ID and customer token associated with a purchase.

In 730, merchant system 110 may aggregate purchase history data for identified customers to generate customer behavior profiles. In some embodiments, Customer Profile Engine 204 may retrieve purchase history data and generate a unique customer behavior profile for each identified customer. In some embodiments, Customer Profile Engine 204 may utilize Analytics Engine 206 to perform analysis on the purchase history data in order to generate a comprehensive customer behavior profile.

In some embodiments, Analytics Engine 206 may utilize the customer behavior profiles generated by Customer Profile Engine 204 as data input for a wide range of Data analyses. For example, Analytics Engine 206 may analyze customer behavior profile data based on selections made by merchant 150 in the merchant system. The results of the analysis may be passed to Visualization Engine 208 to generate a visual representation of the resulting data.

Analytics Engine 206 may receive customer profile data from Customer Profile Engine 204 and perform a wide range of data analysis to identify purchase patterns and customer behavior. For example, Analytics Engine 206 may perform this analysis by applying machine learning algorithms, such as clustering algorithms for segmentation classification for predicting customer actions and association algorithms for marketing basket analysis.

Figure 8:
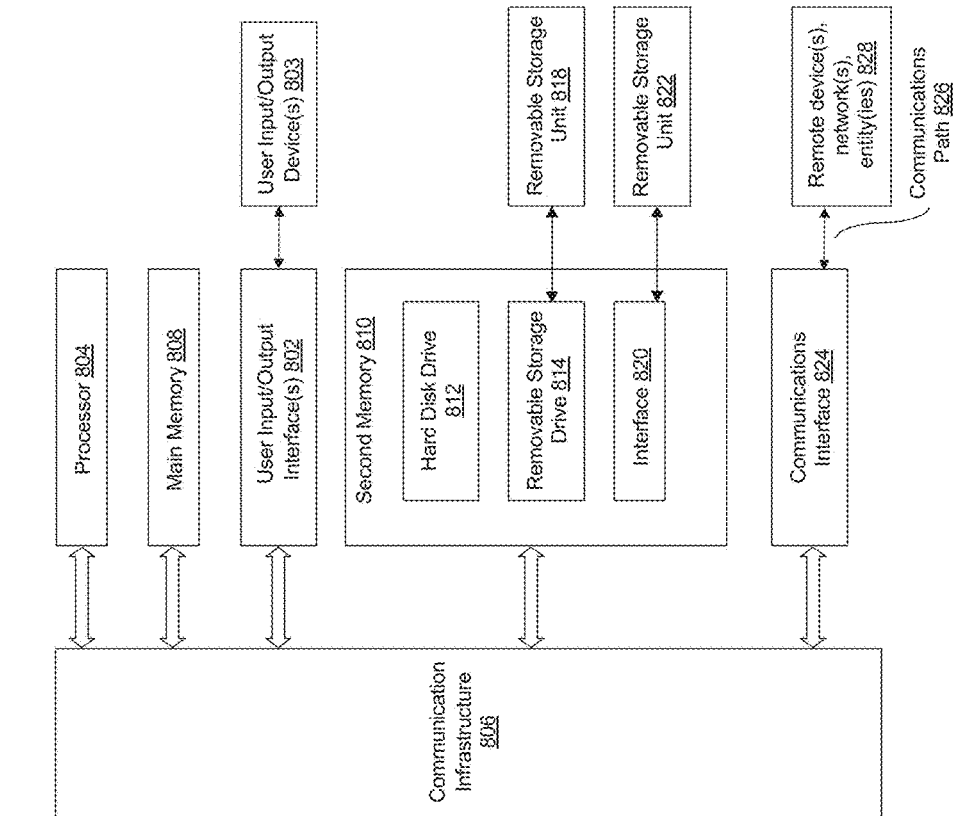
FIG. 8 is an example computer system in accordance with some embodiments.

FIG. 8 illustrates an example computer system 800. Computer system 800 may represent mobile device 102, merchant system 110, payment platform backend 120, etc. The computer system 800 may also include user input/output device(s) 803, such as monitors, keyboards, pointing devices, etc., which may communicate with communication infrastructure 606 through user input/output interface(s) 802.

One or more processors, 804, may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 800 may also include user input/output device(s) 803, such as monitors, keyboards, pointing devices, etc., which may communicate with communication infrastructure 806 through user input/output interface(s) 802.

One or more processors, 804, may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 800 may also include a main or primary memory 808, such as random access memory (RAM). Main memory 808 may include one or more levels of cache. Main memory 808 may have stored therein control logic (i.e., computer software) and/or data.

The computer system 800 may also include one or more secondary storage devices or memory 810. The secondary memory 810 may include, for example, a hard disk drive 812 and/or a removable storage device or drive 814. The removable storage drive 814 may be a floppy disk drive, a magnetic tape drive, a compact disk drive, an optical storage device, tape backup device, and/or any other storage device or storage drive. The removable storage drive 814 may interact with a removable storage unit 818. The removable storage unit 818 may include a computer-usable or readable storage device having stored thereon computer software (control logic) and/or data. The removable storage unit 818 may be a floppy disk, magnetic tape, compact disk, DVD, optical storage disk, and/or any other computer data storage device. The removable storage drive 814 may read from and/or write to the removable storage unit 818.

The secondary memory 810 may include other means, devices, components, instrumentalities, or other approaches for allowing computer programs and/or other instructions and/or data to be accessed by the computer system 800. Such means, devices, components, instrumentalities, or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 800 may further include a communication or network interface 824. The communication interface 824 may enable the computer system 800 to communicate and interact with any combination of external devices, external networks, external entities, etc. (individually and collectively referenced by reference number 828). For example, the communication interface 824 may allow the computer system 800 to communicate with the external or remote devices 828 over communications path 826, which may be wired and/or wireless (or a combination thereof) and which may include any combination of LANs, WANs, the Internet, etc. Control logic and/or data may be transmitted to and from the computer system 800 via the communication path 826.

The computer system 800 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

The computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In accordance with some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computer system 800, the main memory 808, the secondary memory 810, and the removable storage units 818 and 822, as well as tangible articles of manufacture embodying any combination of the foregoing. Such control logic, when executed by one or more data processing devices (such as the computer system 800), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 8. In particular, embodiments can operate with software, hardware, and/or operating system implementations other than those described herein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments but should be defined only in accordance with the following claims and their equivalents.

What is claimed is:

1. A computer-implemented method comprising:

receiving, by one or more computing devices and from a mobile device payment app, a purchase request for a product comprising a payment configuration ID and a device ID, wherein the purchase request is initiated by a customer scanning a purchasing code using the mobile device and wherein the purchasing code is encoded with the payment configuration ID and a merchant account token associated with bank account information for the merchant, tracking a corresponding purchase, wherein the purchase request by the mobile device payment app originates outside a payment system of the merchant, the tracking comprising:

retrieving, from a database and based on the device ID, historical purchases for the customer, wherein the historical purchases comprise purchase information for one or more purchases and wherein the one or more purchases include a purchase request time within a predetermined time period threshold;

determining, based on a comparison of the payment configuration ID of the purchase request and purchase configuration IDs corresponding to the historical purchases, that the purchase request may be a repeat purchase request, wherein the repeat purchase request is based on the customer rescanning the purchasing code within the predetermined time period threshold; and sending, to the mobile device, a warning message prompting the customer to confirm that the purchase request is not a repeat purchase request, wherein:

the warning message is displayed via a user interface (UI) on the mobile device;

the UI includes a confirmation button and a cancel button that, when selected, voids the purchase request.

2. The computer-implemented method of claim 1, wherein selection of the confirmation button causes the mobile device to send an updated purchase request to one or more computing devices, wherein the updated purchase request includes a repeat request status indicating that the updated purchase request is not a repeat request.

3. The computer-implemented method of claim 2 further comprising:

receiving, from the mobile device, the updated purchase request;

storing, in the database, purchase information comprising a purchase request time, the payment configuration ID, and the device ID;

sending, to the mobile device, product information for the product based on the payment configuration ID;

receiving, from a payment platform, a payment confirmation indicating that a purchase payment has been successfully completed by the customer, wherein the payment confirmation comprises a platform identifier identifying the payment platform and transaction data for the purchase, including the payment configuration ID, the device ID, and a customer token for the customer; and sending, to the payment platform, receipt data for the purchase generated based on the transaction data and a receipt code that encodes the receipt data.

4. The computer-implemented method of claim 3, wherein the payment platform is a digital payment platform and wherein the payment platform is selected by the customer from a plurality of payment platforms.

5. The computer-implemented method of claim 4, wherein selection of the payment platform causes the mobile device to launch the mobile device payment app corresponding to the payment platform.

6. The computer-implemented method of claim 3, wherein the payment confirmation further comprises contact information for the customer.

7. The computer-implemented method of claim 6 further comprising:

retrieving purchase data from the database, wherein the purchase data includes transaction details, device IDs, and customer tokens;

analyzing the retrieved purchase data to identify unique customers, based on device IDs and customer tokens associated with the purchase data; and aggregating purchase history for identified customers to generate customer behavior profiles.

8. The computer-implemented method of claim 7, wherein the customer behavior profiles are utilized to derive insights into one or more of purchasing patterns, preferences, and demographic trends associated with the unique customers.

9. The computer-implemented method of claim 7, wherein a machine learning algorithm is utilized to process the purchase data, wherein the machine learning algorithms are configured to learn from the aggregated purchase histories, customer behaviors, and preferences to improve identification of unique customers.

10. A system, comprising:

a memory; and at least one processor coupled to the memory and configured to:

receive, from a mobile device payment app, a purchase request for a product comprising a payment configuration ID and a device ID, wherein the purchase request is initiated by a customer scanning a purchasing code using the mobile device and wherein the purchasing code is encoded with the payment configuration ID and a merchant account token associated with bank account information for the merchant;

track a corresponding purchase, wherein the purchase request by the mobile device payment app originates outside a payment system of the merchant, the tracking comprising:

retrieve, from a database and based on the device ID, historical purchases for the customer, wherein the historical purchases comprise purchase information for one or more purchases and wherein the one or more purchases include a purchase request time within a predetermined time period threshold;

determine, based on a comparison of the payment configuration ID of the purchase request and purchase configuration IDs corresponding to the historical purchases, that the purchase request may be a repeat purchase request, wherein the repeat purchase request is based on the customer rescanning the purchasing code within the predetermined time period threshold; and send, to the mobile device, a warning message prompting the customer to confirm that the purchase request is not a repeat purchase request, wherein:

the warning message is displayed via a user interface (UI) on the mobile device;

the UI includes a confirmation button and a cancel button that, when selected, voids the purchase request.

11. The system of claim 10, wherein selection of the confirmation button causes the mobile device to send an updated purchase request to one or more computing devices, wherein the updated purchase request includes a repeat request status indicating that the updated purchase request is not a repeat request.

12. The system of claim 11, wherein the at least one processor is further configured to:

receive, from the mobile device, the updated purchase request;

store, in the database, purchase information comprising a purchase request time, the payment configuration ID, and the device ID;

send, to the mobile device, product information for the product based on the payment configuration ID;

receive, from a payment platform, a payment confirmation indicating that a purchase payment has been successfully completed by the customer, wherein the payment confirmation comprises a platform identifier identifying the payment platform and transaction data for the purchase, including the payment configuration ID, the device ID, and a customer token for the customer; and send, to the payment platform, receipt data for the purchase generated based on the transaction data and a receipt code that encodes the receipt data.

13. The system of claim 12, wherein the at least one processor is further configured to:

retrieve purchase data from the database, wherein the purchase data includes transaction details, device IDs, and customer tokens;

analyze the retrieved purchase data to identify unique customers, based on device IDs and customer tokens associated with the purchase data; and aggregate purchase history for identified customers to generate customer behavior profiles.

14. The system of claim 13, wherein the customer behavior profiles are utilized to derive insights into one or more of purchasing patterns, preferences, and demographic trends associated with the unique customers.

15. The system method of claim 13, wherein a machine learning algorithm is utilized to process the purchase data, wherein the machine learning algorithms are configured to learn from the aggregated purchase histories, customer behaviors, and preferences to improve identification of unique customers.

16. A non-transitory computer-readable device having instructions stored thereon that, when executed by at least one computing device, cause the at least one computing device to perform operations comprising:

receiving, from a mobile device payment app, a purchase request for a product comprising a payment configuration ID and a device ID, wherein the purchase request is initiated by a customer scanning a purchasing code using the mobile device and wherein the purchasing code is encoded with the payment configuration ID and a merchant account token associated with bank account information for the merchant;

tracking a corresponding purchase, wherein the purchase request by the mobile device payment app originates outside a payment system of the merchant, the tracking comprising:

retrieving, from a database and based on the device ID, historical purchases for the customer, wherein the historical purchases comprise purchase information for one or more purchases and wherein the one or more purchases include a purchase request time within a predetermined time period threshold;

determining, based on a comparison of the payment configuration ID of the purchase request and purchase configuration IDs corresponding to the historical purchases, that the purchase request may be a repeat purchase request, wherein the repeat purchase request is based on the customer rescanning the purchasing code within the predetermined time period threshold; and sending, to the mobile device, a warning message prompting the customer to confirm that the purchase request is not a repeat purchase request, wherein:

the warning message is displayed via a user interface (UI) on the mobile device;

the UI includes a confirmation button and a cancel button that, when selected, voids the purchase request.

17. The non-transitory computer-readable device of claim 16, wherein selection of the confirmation button causes the mobile device to send an updated purchase request to one or more computing devices, wherein the updated purchase request includes a repeat request status indicating that the updated purchase request is not a repeat request.

18. The non-transitory computer-readable device of claim 17, the operations further comprising:

receiving, from the mobile device, the updated purchase request;

storing, in the database, purchase information comprising a purchase request time, the payment configuration ID, and the device ID;

sending, to the mobile device, product information for the product based on the payment configuration ID;

receiving, from a payment platform, a payment confirmation indicating that a purchase payment has been successfully completed by the customer, wherein the payment confirmation comprises a platform identifier identifying the payment platform and transaction data for the purchase, including the payment configuration ID, the device ID, and a customer token for the customer; and sending, to the payment platform, receipt data for the purchase generated based on the transaction data and a receipt code that encodes the receipt data.

19. The non-transitory computer-readable device of claim 18, the operations further comprising:

retrieving purchase data from the database, wherein the purchase data includes transaction details, device IDs, and customer tokens;

analyzing the retrieved purchase data to identify unique customers, based on device IDs and customer tokens associated with the purchase data; and aggregating purchase history for identified customers to generate customer behavior profiles.

20. The non-transitory computer-readable device of claim 19, wherein a machine learning algorithm is utilized to process the purchase data, wherein the machine learning algorithms are configured to learn from the aggregated purchase histories, customer behaviors, and preferences to improve identification of unique customers.

* * * * *